Aug. 9, 1960 J. W. ARMSTRONG ET AL Re. 24,852
METHOD OF COATING INTERIOR OF TUBING WITH ZINC
Original Filed July 7, 1952
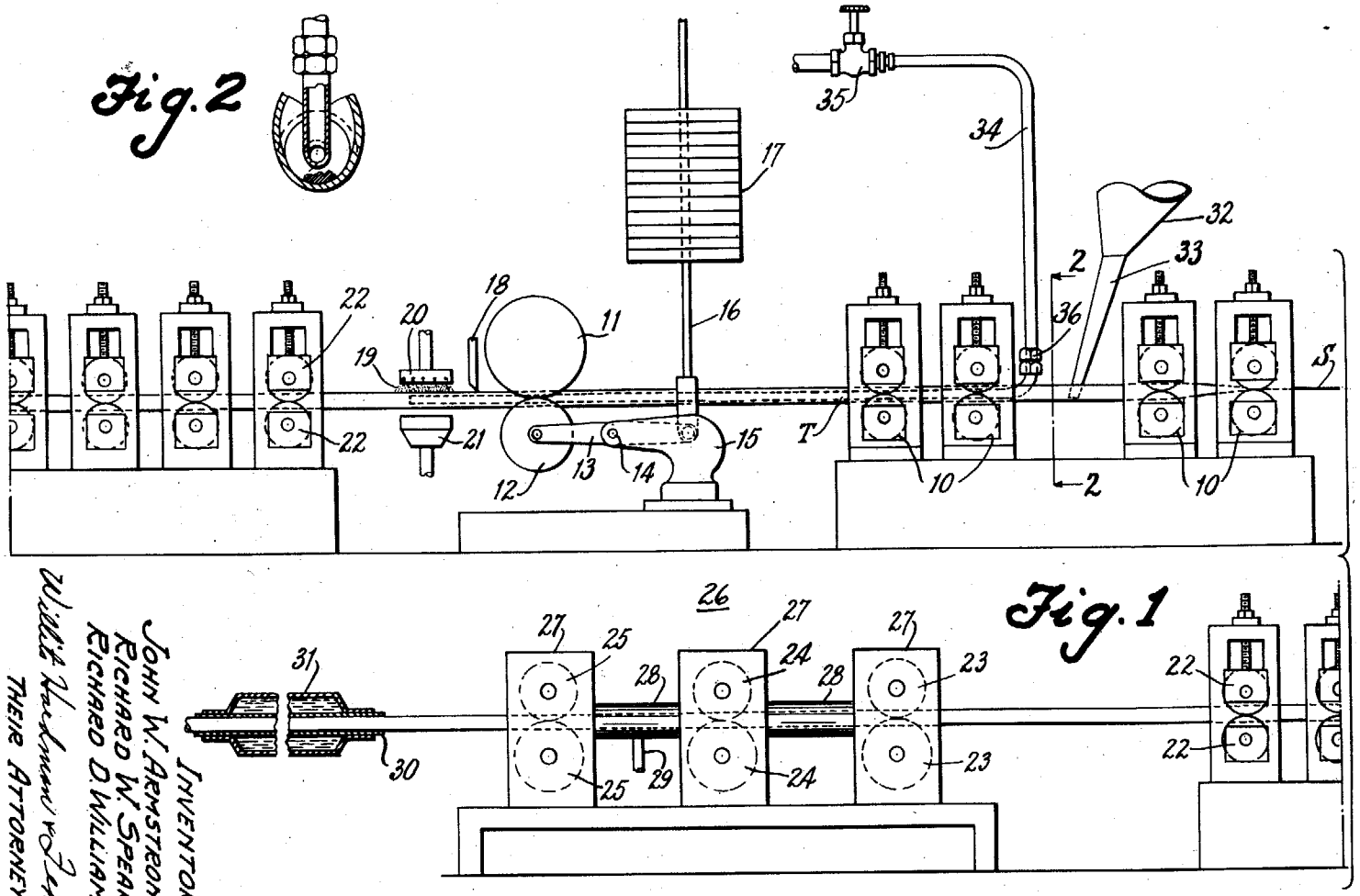
INVENTORS
JOHN W. ARMSTRONG
RICHARD W. SPEARS
RICHARD D. WILLIAMS
Willis Hardman & Fehr
THEIR ATTORNEYS United States Patent Office Re. 24,852
Reissued Aug. 9, 1960

24,852

METHOD OF COATING INTERIOR OF TUBING WITH ZINC

John W. Armstrong, Racine, Wis., and Richard W. Spears, Rochester, and Richard D. Williams, Fairport, N.Y., assignors to General Motors Corporation, Detroit, Mich., a corporation of Delaware Original No. 2,771,669, dated Nov. 27, 1956, Ser. No. 297,552, July 7, 1952. Application for reissue Feb. 18, 1958, Ser. No. 715,989

19 Claims. (Cl. 29—429)

Matter enclosed in heavy brackets [ ] appears in the original patent but forms no part of this reissue specification; matter printed in italics indicates the additions made by reissue.

This invention relates to the manufacture of welded steel tubing and the primary object of the invention is to provide an improved method of and apparatus for coating the interior surface of the tubing with a permanent coating of a non-ferrous metal which is securely bonded to the tube surface.

According to the present invention, this is accomplished by introducing progressively into the tubing during its continuous formation from a flat strip of steel and while the tubing is being moved continuously through the tube forming mill, a non-ferrous metal, such as zinc or cadmium, for example, in the form of relatively fine particles, or small lumps, or by feeding continuously into the tube a zinc wire before the tube is fully formed. At about the same point where the non-ferrous metal is introduced a pipe extends into the tube and longitudinally thereof to a point where the tube is fully formed, for introduction of a non-oxidizing gas. After introduction of the non-ferrous metal, the formation of the tube is completed and it subsequently passes through a welding device, then through suitable sizing rolls to an annealing device where the temperature of the tube is raised to a point sufficient to vaporize a metal such as zinc. After this heating of the tube it passes through a cooling device which causes zinc to be condensed and precipitated on the tube wall. Subsequent to the cooling operation the zinc-coated tube is rolled into a roll and a solution containing chromic acid or some suitable chromium salt, such as sodium or potassium dichromate, for example, is pumped through the tubing for a brief interval after which water is forced through the tubing to wash it out.

Further objects and advantages of the present invention will be apparent from the following description, reference being had to the accompanying drawings wherein a preferred embodiment of the present invention is clearly shown.

In the drawings:

Figure 1 is a diagrammatic view of a tube forming mill provided with apparatus for carrying out the present invention;

Figure 2 is a section on line 2—2 of Fig. 1 on a somewhat enlarged scale.

Referring to Fig. 1, the tube forming mill includes a group of tube forming devices each of which includes a pair of rolls 10 and there may be any suitable number of these devices. These pairs of rolls progressively form a flat steel strip S into a tube T with an open seam at the top where the edges of the strip abut. The formed tube then passes between rolls 11 and 12 of a suitable welding apparatus to effect welding of the seam. The roll 12 is a pressure roll carried by a lever arm 13 pivoted at 14 on a suitable fixed support 15 and connected at the opposite end to a vertically extending rod 16 which carries a group of weights 17 which are removable so as to regulate the pressure which is applied to the roll 12. The specific construction of the welder is of no importance so far as this invention is concerned and any suitable welding apparatus may be used, with any suitable means to create the desired welding pressure.

As the tube leaves the welding apparatus it passes under a cutting tool 18 which trims off excess metal from the welded seam and then under jets of water 19 supplied by a nozzle 20 and carried off by a drain 21, in order to reduce the temperature of the tube, which is heated to a considerable extent during the welding of the seam, but insufficiently to vaporize the zinc or other coating metal.

After the tube is cooled as described, it passes through a plurality of pairs of sizing and shaping rolls 22, there being as many of these pairs of rolls as necessary to effect the required sizing and shaping operations. Subsequent to the sizing and shaping operations the tube T passes sucessively between pairs of copper rolls 23, 24 and 25 of an annealing device indicated in its entirety by reference number 26. The specific construction of this device is not material at all to this invention and may be of the same construction as shown in the copending application of Rea I. Hahn, S.N. 101,402, filed June 25, 1949. As shown, the several pairs of rolls are positioned within housings 27 and these housings are connected by tubes 28 of suitable refractory material through which the tube T passes. A non-oxidizing gas may be introduced through the pipe 29, if desirable. The tubing is electrically heated by current passing through the copper rolls of the annealing device as the tubing moves therethrough, the temperature thereof being progressively raised to effect the annealing function, and the temperature of the tubing, as it passes between the rolls 24 and 25 is between 1800° and 2000° F.

After passing through the annealer, the tube is cooled by passage through a cooling device comprising an inner tube 30, through which the tube T passes, and an outer tube 31 between which is formed a water jacket through which cooling water can be constantly circulated. After the cooling operation is completed, the tube may be cut into whatever lengths are desired. If cut in great lengths, the tubing is rolled on large reels, but it can be cut in shorter lengths and stored in straight pieces.

In carrying out the present invention, any form of suitable hopper or funnel 32 may be provided, having a narrow outlet spout 33 which extends, as shown, into the tubing T between the second and third pairs of forming rolls 10 at a point where the tube T is not closed at the top, as best shown in Fig. 2. The specific construction of this mechanism is not a part of this invention and any suitable device can be used, through which zinc pellets or small particles may be introduced into the moving tube T, at a substantially uniform rate depending upon the size and speed of movement of the tube. If desired, instead of using a funnel arrangement such as that shown for introducing zinc particles into the tube, the zinc may be introduced into the tube in the form of a wire which would be fed into the tube at a rate dependent upon the size of the tube and wire and the speed of operation of the tube. Obviously, in order to provide a uniform coating the amount of zinc or other metal must vary both with respect to the size of the tube and with respect to the speed of movement thereof. For example, it has been found that to get a uniform coating it is necessary to introduce .0015 cubic inch of zinc per foot of tube where the tube size is ⅝″.

Extending into the tube T at a point adjacent to the point of introduction of the zinc is a pipe 34 having a control valve 35 for the introduction of a non-oxidizing gas. The pipe 34 has a part which extends axially and to the left within the tube T to a point beyond the welding device, as shown in Fig. 1, and this part of the pipe, as shown, is connected to the vertical part by a suitable coupling 36 to facilitate assembly. Of course, at the point of discharge of the pipe 34 the tube T is fully formed so that a reducing atmosphere will be present in the tube as it moves along through the various operations described, but if additional reducing gas is required, it may be introduced through pipe 29 at the point of vaporization of the zinc or other coating metal.

The tube is not sufficiently heated by the welding operation or by the rolls 23 to effect vaporization of the coating metal but is heated to such a degree as it passes from the rolls 24 to rolls 25. For example, if zinc is used, the vaporization temperature of zinc is about 1665° F. and at the point referred to the tube is heated to a point between 1800° and 2000° F. The zinc particles are converted at this temperature into zinc vapor and as the tube passes from the annealing device into the cooling device 31 the temperature is reduced enough to condense the zinc vapor, and this condensate adheres uniformly and firmly to the inner surfaces of the tube in the form of a thin film or coating which is of substantially the same thickness over the entire tube surface.

It has been observed that there is some very slight difference in the thickness of the coating film at the top and bottom of the tube, the thickness being greater at the bottom to a very slight extent, but when the tube is cooled, the coating film solidifies so rapidly that there is substantially no tendency for the coating metal to run toward the bottom of the tube and the difference in thickness of the film is so little as to be substantially negligible.

It has been found in practice that the heating of the tube T as such tube passes through the annealing device, at the ordinary speed of operation of the tube mill, is sufficient to effect the desired vaporization of the coating metal so that the speed of operation of the mill does not have to be slowed down to effect the coating of the tube and when the described method is carried out the interior of the tube will be coated with a thin layer of corrosion-resistant metal effectively bonded to the steel. When the zinc vapor cools, after the tube leaves the annealing device, sufficiently for such vapor to condense, the condensate enters the minute pores of the steel so that the coating metal is securely anchored to the inner surface of the steel tube and forms a continuous non-corrosive coating thereon. As a matter of fact, the coating metal, such as zinc, will alloy to some extent with the steel so as to form an alloy bond.

As stated briefly hereinbefore, the coated inner surface of the tube T is treated, after the coating metal is applied in the manner described, with a solution of chromic acid or potassium dichromate to improve the surface and increase the corrosion resistance properties thereof. After the tube passes through the cooling device 30—31 it is cut off by any suitable means in whatever lengths may be desired, either in relatively short pieces or in lengths of great magnitude which are rolled up on suitable rolls. To treat the coated surface as described, the solution is pumped through the coated tubing by any suitable means for a sufficient time to obtain the result desired.

This step of the process which is the subject of the present invention is not novel per se but is a standard treatment used in many applications for increasing the corrosion resistance of a zinc surface. As an example of a standard treatment which can be employed with satisfactory results, the zinc surface is treated with a solution in which each gallon contains 26–27 ounces of sodium dichromate, 23–34 cc. of sulphuric acid, pH control 1 to 1.5, and for from 15 to 30 seconds. This is merely an example of a standard practice and the concentration of the solution can be varied as well as the time of application, the time required being less with a more highly concentrated solution. The application of the solution is usually effected at room temperature or at slightly higher temperatures up to 100° F. for example.

Another standard practice is to employ a solution of chromic acid with sulphuric or nitric acid instead of using a chromate or dichromate of sodium, potassium or other metal. In such solutions a lesser percentage of chromic acid is employed, the acid being more active than a chromate or dichromate.

One specific example of treatment with a solution containing chromic and sulphuric acid which has been used by the applicants with success is to subject the surface to be treated to the action of a solution of a compound known to trade as Iridite No. 8, and water. The exact composition of this material is not known but it contains both chromic and sulphuric acid and when a zinc coated tube is treated with a solution of such material and water, the anti-corrosive properties of the coated surface are much increased. There can be considerable variation in the strength of the solution which is employed. A solution as high as 10 to 20 percent Iridite can be employed, with the time of application varying from 3 seconds down to 1 second, as the solution strength is increased. Likewise, good results can be obtained with a weak solution if the time of application is longer. For example, a 2 percent solution can be used with a time cycle of approximately 20 seconds, and even weaker solutions can be used if the time cycle is approximately increased. In practice, applicants have found that an Iridite solution of approximately three percent strength with a time cycle of 10 to 15 seconds gives excellent results.

All of the treatments such as described above bring about a chemical reaction which results in the formation, on the zinc coating of the tube, of a thin layer of some form of a zinc-chromium salt, more or less yellow in color, which decreases oxidation and greatly increases the resistance to corrosion of the zinc coating, thus materially increasing the effective life of the tubing.

The particular means employed for treating the zinc coated interior surface of the tubing with a solution of whatever chromium derivative is used in the treatment of such surface is not material so far as the present invention is concerned. For example, any suitable pumping apparatus may be employed by means of which the solution used may be pumped through the tubing for the required time. During this operation the solution employed is caused to flow through the tube at no substantial pressure and, as previously set forth, at room temperature or temperatures slightly in excess thereof.

Subsequent to this treatment of the tubing, the tubing is rinsed to eliminate any excess of the chrome solution. Obviously, this rinsing of the tubing can be effected as an entirely separate operation by merely pumping water through the tubing at substantially no pressure to rinse it out. However, it has been found that this operation can also be utilized for the purpose of simultaneously testing the tubing for leakage. In order to clean out the excess chrome solution and at the same time test the tube for leakage, the cleaning water is forced through the tubing under a heavy enough pressure and for a long enough time to indicate any leaks. If there are defects in the tubing which would cause leakage, the cleaning water, being under relatively heavy pressure will be forced through the tube and will appear on the outer surface and elimination of the excess chrome solution can be effected just as well if the rinse water is forced through the tube under pressure as otherwise. The particular means for forcing the rinse water through the tubing at high pressure is not material and any suitable means for building up the pressure can be employed. For example, the outlet of the tubing which is being rinsed can be restricted with reference to the inlet thereof to whatever extent is necessary to build up the required liquid pressure within the tubing.

While the embodiment of the present invention as herein disclosed constitutes a preferred form, it is to be understood that other forms might be adopted.

What is claimed is as follows:

1. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, subsequently heating the tube sufficiently to vaporize the coating metal, and thereafter cooling the tubing to effect condensation of the vaporized metal on the surface of the tubing.

2. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, supplying additional non-oxidizing gas adjacent the tubing as the tubing is heated to vaporize the coating metal, and thereafter cooling the tubing to effect condensation of the vaporized metal on the surface of the tubing.

3. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, thereafter heating the tubing during its continued movement to a degree sufficient to simultaneously effect annealing of the tubing and vaporization of the coating metal, and then cooling the tube sufficiently to effect condensation of the vaporized metal on the inner surface of the tubing.

4. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, thereafter heating the tubing during its continued movement to a degree sufficient to simultaneously effect annealing of the tubing and vaporization of the coating metal, supplying additional non-oxidizing gas around the tubing at the point where the tubing is heated, and then cooling the tubing sufficiently to effect condensation of the vaporized metal on the inner surface of the tubing.

5. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, subsequently heating the tube sufficiently to vaporize the coating metal, then cooling the tubing to effect condensation of the vaporized coating metal on the inner surface of the tubing and finally applying to the inner surface of the tubing a solution of a chromium compound in order to increase the resistance of said surface to corrosion.

6. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, thereafter heating the tubing during its continued movement to a degree sufficient to simultaneously effect annealing of the tubing and vaporization of the coating metal, then cooling the tube sufficiently to effect condensation of the vaporized metal on the inner surface of the tubing and finally applying to the inner surface of the tubing a solution of a chromium compound in order to increase the resistance of said surface to corrosion.

7. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, thereafter heating the tubing during its continued movement to a degree sufficient to simultanosuly effect annealing of the tubing and vaporization of the coating metal, then cooling the tube sufficiently to effect condensation of the vaporized metal on the inner surface of the tubing and finally applying to the inner surface of the tubing a solution of a chromium compound for a sufficient length of time to form on the surface of the condensed metal a thin coating containing a chromium derivative so as to increase the resistance of such surface to corrosion.

8. In the manufacture of steel tubing which is formed continuously from a flat steel strip by bending the strip into tubular form and welding the abutting edges of the tube as it is continuously moved past a welding device; the method of coating the interior surface of the tubing during its continuous formation and while it is being moved continuously with a non-corrosive metal such as zinc which comprises the steps of introducing particles of said metal into the tubing before the tubing is fully formed and while it is below welding temperature, introducing a non-oxidizing gas into the tube after it is fully formed and welded, subsequently heating the tube sufficiently to vaporize the coating metal, then cooling the tubing to effect condensation of the vaporized coating metal on the interior surface of the tubing, applying to the inner coated surface of the tubing a solution of a chromium compound in order to increase the resistance of said surface to corrosion, and finally forcing water through the tubing at relatively high pressure to simultaneously wash out any excess of said solution and to test the tubing for leakage.

*9. In the manufacture of metal tubing which is formed continuously from a flat steel strip by bending the strip into tubular form and welding the abutting edges of the tube as it is continuously moved past a welding device, the method of coating the interior surface of the tubing during its continuous formation and while it is being moved continuously with a suitable non-ferrous metal having properties of vaporization, adherence to ferrous metals and non-corrosion similar to those of zinc and cadmium which comprises the steps of introducing said metal into the tubing before the tubing is fully formed and while it is below welding temperature, introducing a non-oxidizing gas into the tube after it is fully formed and welded, heating the tubing sufficiently to vaporize the coating metal, and thereafter cooling the tube to effect condensation of the vaporized metal on the surface of the tubing.*

*10. In the manufacture of metal tubing which is formed continuously from a flat steel strip by bending the strip into tubular form and welding the abutting edges of the tube as it is continuously moved past a welding device, the method of coating the interior surface of the tubing during its continuous formation and while it is being moved continuously with a metal having properties of vaporization, adherence to ferrous metals and non-corrosion similar to those of zinc and cadmium which comprises the steps of introducing said metal into the tubing before the tubing is fully formed and while it is below welding temperature, introducing a non-oxidizing gas into the tube after it is fully formed and welded, supplying additional non-oxidizing gas adjacent the tubing as the tubing is heated to vaporize the coating metal, and thereafter cooling the tubing to effect condensation of the vaporized metal on the inner surface of the tubing.*

*11. In the manufacture of steel tubing which is formed continuously from a flat steel strip by bending the strip into tubular form and welding the abutting edges of the tube as it is continuously moved past the welding device, the method of coating the interior surface of the tubing during its continuous formation and while it is being moved continuously with a metal having properties of vaporization, adherence to ferrous metals and non-corrosion similar to those of zinc and cadmium which comprises the steps of introducing a wire of said metal into the tubing before the tubing is fully formed and while it is below welding temperature, introducing a non-oxidizing gas into the tube after it is fully formed and welded, heating the tubing during its continued movement to a degree sufficient to simultaneously effect annealing of the tubing and vaporization of the coating metal, and cooling the tube sufficiently to effect condensation of the vaporized metal on the inner surface of the tubing.*

*12. In the manufacture of steel tubing which is formed continuously from a flat steel strip by bending the strip into tubular form and welding the abutting edges of the tube as it is continuously moved past the welding device, the method of coating the interior surface of the tubing during its continuous formation and while it is being moved continuously with a metal having properties of vaporization, adherence to ferrous metals and non-corrosion similar to those of zinc and cadmium which comprises the steps of introducing a wire of said metal into the tubing before the tubing is fully formed and while it is below welding temperature, introducing a non-oxidizing gas into the tube after it is fully formed and welded, thereafter heating the tubing during its continued movement to a degree sufficient to simultaneously effect annealing of the tubing and vaporization of the coating metal, supplying additional non-oxidizing gas around the tubing at the point where the tubing is heated, and then cooling the tubing sufficiently to effect condensation of the vaporized metal on the inner surface of the tubing.*

*13. In the manufacture of steel tubing which is formed continuously from a flat steel strip by bending the strip into tubular form and welding the abutting edges of the tube as it is continuously moved past the welding device, the method of coating the interior surface of the tubing during its continuous formation and while it is being moved continuously with cadmium which comprises the steps of introducing cadmium into the tubing before the tubing is fully formed and while it is below welding temperature, introducing a non-oxidizing gas into the tube after it is fully formed and welded, heating the tube sufficiently to vaporize the coating metal, and cooling the tubing to effect condensation of the vaporized metal on the surface of the tubing.*

*14. In the manufacture of steel tubing which is formed continuously from a flat steel strip by bending the strip into tubular form and welding the abutting edges of the tube as it is continuously moved past the welding device, the method of coating the interior surface of the tubing during its continuous formation and while it is being moved continuously with cadmium which comprises the steps of introducing a wire of cadmium into the tubing before the tubing is fully formed and while it is below welding temperature, introducing a non-oxidizing gas into the tube after it is fully formed and welded, heating the tube sufficiently to vaporize the coating metal, cooling the tubing to effect condensation of the vaporized coating metal on the inner surface of the tubing.*

*15. In the manufacture of steel tubing which is formed continuously from a flat steel strip by bending the strip into tubular form and welding the abutting edges of the tube as it is continuously moved past the welding device, the method of coating the interior surface of the tubing during its continuous formation and while it is being moved continuously with cadmium which comprises the steps of introducing cadmium into the tubing before the tubing is fully formed and while it is below the welding temperature, introducing a non-oxidizing gas into the tube after it is fully formed and welded, applying additional non-oxidizing gas adjacent the tubing as the tubing is heated to vaporize the coating metal, heating the tubing sufficiently to vaporize the cadmium and cooling the tubing to effect condensation of the vaporized metal on the surface of the tubing.*

*16. In the manufacture of metal tubing which is formed continuously from a flat steel strip by bending the strip into tubular form and welding the abutting edges of the tube as it is continuously moved past a bonding device, the method of coating the interior surface of the tubing during its continuous formation and while it is being moved continuously with zinc which comprises the steps of introducing zinc into the tubing before the tubing is fully formed and while it is below welding temperature, introducing a non-oxidizing gas into the tube after it is fully formed and welded, heating the tubing during its continued movement to a degree sufficient to simultaneously effect annealing of the tubing and vaporization of the coating metal, cooling the tube sufficiently to effect condensation of the vaporized metal on the inner surface of the tubing.*

*17. In the manufacture of metal tubing which is formed continuously from a flat steel strip by bending the strip into tubular form and welding the abutting edges of the tube as it is continuously moved past a bonding device, the method of coating the interior surface of the tubing during its continuous formation and while it is being moved continuously with zinc which comprises the steps of introducing a wire of zinc into the tubing before the tubing is fully formed and while it is below welding temperature, introducing a non-oxidizing gas into the tube after it is fully formed and welded, thereafter heating the tubing during its continued movement to a degree sufficient to simultaneously effect annealing of the tubing*

*and vaporization of the coating metal, then cooling the tube sufficiently to effect condensation of the vaporized metal on the inner surface of the tubing and finally applying to the inner surface of the tubing a solution of a chromium compound in order to increase the resistance of said surface to corrosion.*

*18. In the manufacture of steel tubing which is formed continuously from a flat strip by bending the strip into tubular form and welding the abutting edges of the tube as it is continuously moved past the welding device, the method of coating the interior surface of the tubing during its continuous formation and while it is being moved continuously with zinc which comprises the steps of introducing a wire of zinc into the tubing before the tubing is fully formed and while it is below welding temperature, introducing a non-oxidizing gas into the tube after it is fully formed and welded, thereafter heating the tubing during its continued movement to a degree sufficient to simultaneously effect annealing of the tubing and vaporization of the coating metal, then cooling the tube sufficiently to effect condensation of the vaporized metal on the inner surface of the tubing and finally applying to the inner surface of the tubing a solution of a chromium compound for a sufficient length of time to form on the surface of the condensed metal a thin coating containing a chromium derivative so as to increase the resistance of such surface to corrosion.*

*19. In the manufacture of steel tubing which is formed continuously from a flat steel strip by bending the strip into tubular form and welding the abutting edges of the tube as it is continuously moved past the welding device, the method of coating the interior surface of the tubing during its continuous formation and while it is being moved continuously with zinc which comprises the steps of introducing a wire of zinc into the tubing before the tubing is fully formed and while it is below welding temperature, introducing a non-oxidizing gas into the tube after it is fully formed and welded, subsequently heating the tube sufficiently to vaporize the coating metal, then cooling the tubing to effect condensation of the vaporized coating metal on the interior surface of the tubing, applying to the inner coated surface of the tubing a solution of a chromium compound in order to increase the resistance of said surface to corrosion, and finally forcing water through the tubing at relatively high pressure to simultaneously wash out any excess of said solution and to test the tubing for leakage.*

References Cited in the file of this patent or the original patent

UNITED STATES PATENTS

| | | |
|---|---|---|
| 1,506,971 | Bundy | Sept. 2, 1924 |
| 1,524,056 | Pritchard | Jan. 27, 1925 |
| 1,818,008 | Ritter | Aug. 11, 1931 |
| 1,892,607 | Bundy | Dec. 27, 1932 |
| 2,085,313 | Guthrie | June 29, 1937 |
| 2,126,556 | Hughes | Aug. 9, 1938 |
| 2,206,064 | Thompson | July 2, 1940 |
| 2,210,338 | Quarnstrom | Aug. 6, 1940 |
| 2,442,485 | Cook | June 1, 1948 |
| 2,491,284 | Sears | Dec. 13, 1949 |
| 2,559,878 | Johnson | July 10, 1951 |
| 2,657,457 | Toulmin | Nov. 3, 1953 |
| 2,822,291 | Hahn | Feb. 4, 1958 |

FOREIGN PATENTS

| | | |
|---|---|---|
| 124,283 | Great Britain | Mar. 21, 1919 |
| 363,954 | Great Britain | Dec. 31, 1931 |
| 795,238 | France | Mar. 9, 1936 |
| 552,126 | Great Britain | Mar. 24, 1943 |
| 572,703 | Great Britain | Oct. 19, 1945 |